United States Patent
McCoy et al.

(10) Patent No.: US 9,258,613 B2
(45) Date of Patent: Feb. 9, 2016

(54) METHOD AND APPARATUS FOR MANIPULATING VIDEO CONTENT

(75) Inventors: Charles McCoy, Coronado, CA (US); Ling Jun Wong, Escondido, CA (US); True Xiong, San Diego, CA (US)

(73) Assignees: SONY CORPORATION, Tokyo (JP); SONY NETWORK ENTERTAINMENT INTERNATIONAL LLC, Los Angeles, CA (US)

( * ) Notice: Subject to any disclaimer, the term of this patent is extended or adjusted under 35 U.S.C. 154(b) by 437 days.

(21) Appl. No.: 13/077,674

(22) Filed: Mar. 31, 2011

(65) Prior Publication Data

US 2012/0210344 A1 Aug. 16, 2012

Related U.S. Application Data

(60) Provisional application No. 61/443,481, filed on Feb. 16, 2011.

(51) Int. Cl.

| | |
|---|---|
| *H04N 7/16* | (2011.01) |
| *H04N 21/472* | (2011.01) |
| *H04N 21/2225* | (2011.01) |
| *H04N 21/239* | (2011.01) |
| *H04N 21/24* | (2011.01) |
| *H04N 21/61* | (2011.01) |

(52) U.S. Cl.
CPC ..... *H04N 21/47202* (2013.01); *H04N 21/2225* (2013.01); *H04N 21/2393* (2013.01); *H04N 21/2402* (2013.01); *H04N 21/2404* (2013.01); *H04N 21/6125* (2013.01); *H04N 21/6175* (2013.01)

(58) Field of Classification Search
None
See application file for complete search history.

(56) References Cited

U.S. PATENT DOCUMENTS

| | | | | |
|---|---|---|---|---|
| 6,151,626 | A * | 11/2000 | Tims et al. | 725/25 |
| 2003/0086023 | A1* | 5/2003 | Chung et al. | 348/714 |
| 2004/0073566 | A1* | 4/2004 | Trivedi | 707/102 |
| 2007/0035612 | A1* | 2/2007 | Korneluk et al. | 348/14.01 |
| 2008/0084867 | A1 | 4/2008 | Foti et al. | |
| 2009/0138921 | A1* | 5/2009 | Miyata | 725/80 |
| 2009/0144642 | A1* | 6/2009 | Crystal | 715/764 |
| 2011/0173574 | A1* | 7/2011 | Clavin et al. | 715/863 |
| 2012/0017250 | A1* | 1/2012 | Tirasirikul et al. | 725/85 |
| 2012/0162536 | A1* | 6/2012 | Sibilsky et al. | 348/734 |

FOREIGN PATENT DOCUMENTS

| | | |
|---|---|---|
| CN | 101764920 | 6/2010 |
| CN | 101938616 | 1/2011 |

OTHER PUBLICATIONS

Office Action issued in corresponding Chinese application No. 201210027448.3 dated Jan. 6, 2014.

* cited by examiner

*Primary Examiner* — Joshua Taylor
(74) *Attorney, Agent, or Firm* — Frommer Lawrence & Haug LLP; William S. Frommer; Paul A. Levy

(57) ABSTRACT

An apparatus and method for manipulating video content that includes accessing, from a server, a list of one or more Internet Protocol television (IPTV) devices and selecting an IPTV device from the list. The server provides a content list of content that may be played on the selected IPTV device. The secondary device provides a control function and reachability (availability to communicate) of the selected IPTV device is determined by the server. The execution of the control function provided by the secondary device is independent of whether the selected IPTV device is reachable or not.

18 Claims, 7 Drawing Sheets

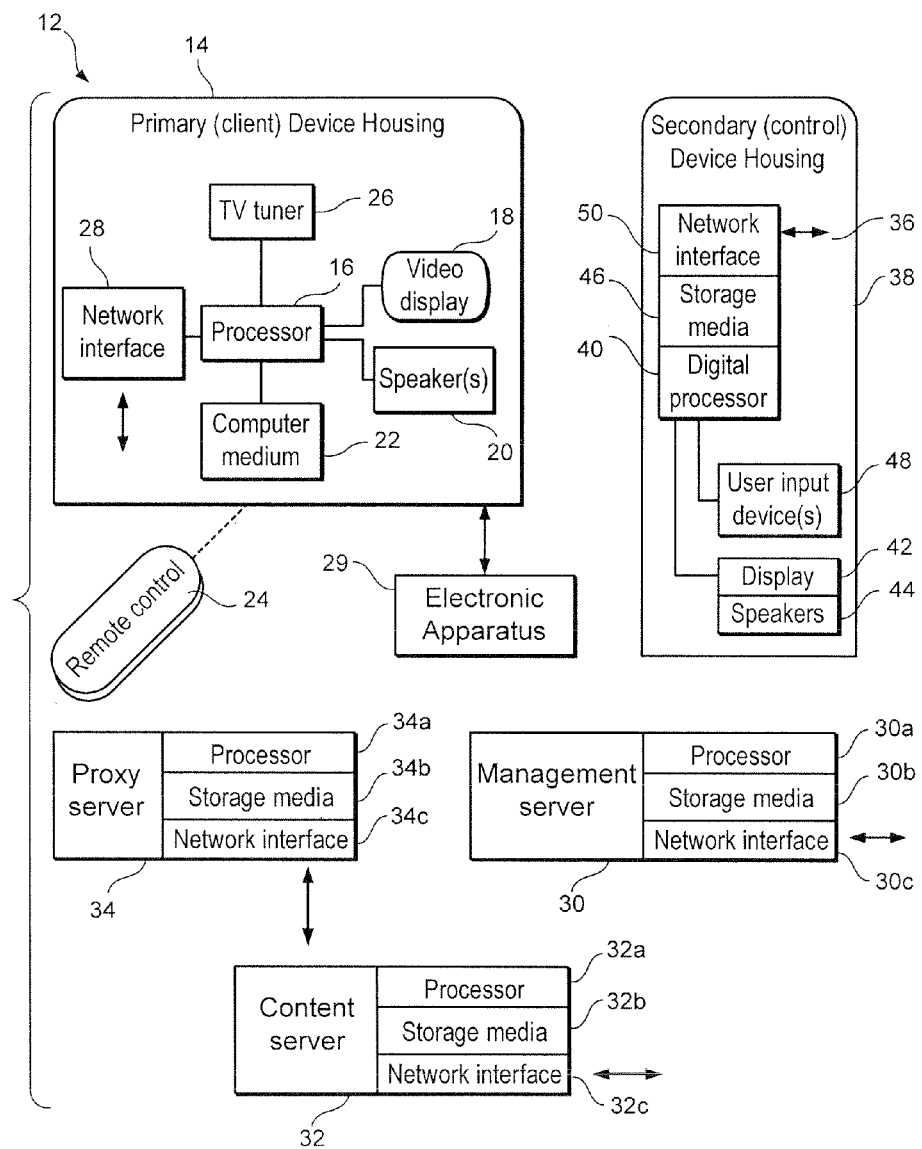
F I G. 1

METHOD AND APPARATUS FOR MANIPULATING VIDEO CONTENT

CLAIM TO PRIORITY

This application claims benefit of previously filed U.S. provisional application Ser. No. 61/443,481, filed Feb. 16, 2011, which is hereby incorporated by reference in its entirety herein.

BACKGROUND

1. Field of the Invention

This invention relates generally to a system and method of controlling one device capable of accessing Internet Protocol Television (IPTV) using a second device and more specifically to manipulating video content.

2. Background Discussion

IPTV is capable of receiving services delivered using the architecture and networking methods of the Internet Protocol Suite and additionally, may be capable of receiving services delivered using a broadcasting network. IPTV services include, for example, live television, time-shifted programming, video on demand (VOD), and on-line transactions.

SUMMARY

Embodiments of the present invention are directed to allowing users to manipulate internet content, such as videos, "on the move", which means that a play list may be displayed on a device, or display module that is not the user's primary display. For example, a primary display device, or module may be in the user's home or business or usual viewing location. A secondary device may be an external display used in conjunction with the user's primary display and may be located at a different location. The secondary device may be a mobile telephone or other non-IPTV device. By being able to browse internet content on the move, using the secondary device, the user is able to manage a list of assets even though he is not in proximity to or in the same network as an IPTV device.

By managing the list of assets, the user is able to for example: subscribe to other user's lists; manage his own list; share an asset with another subscriber; purchase assets from service providers, or purchase assets from an online vendor or website or television advertisement, such as a commercial or products offered on a shopping service.

For security purposes, secure content is only playable by authentic IPTV devices to prevent exposure of content uniform resource locaters (URLs). As the secondary display might not be an authentic IPTV device, it may not be permitted to display the content on which the user is navigating. However, content that is not secure, such as a movie trailer that is available to the general public, may also be viewed on either an IPTV device, which may not have been authenticated, and/or the secondary display, depending on where the user wishes to view the content.

Another embodiment of the present invention is directed to a method for manipulating video content that includes accessing, from a server, a list of one or more IPTV devices and selecting an IPTV device from the list. The server provides a content list of content that may be played on the selected IPTV device. The secondary device provides a content navigation and IPTV control function, also referred to herein as selection function. Reachability of the selected IPTV device may be determined by the server, for example in cases where communication between the secondary device and the selected IPTV device is routed through the server. In other cases, the secondary device may communicate directly with the selected IPTV device and determine reachability. The execution of the content navigation and IPTV control function provided by the secondary device is independent of whether the selected IPTV device is reachable.

Another embodiment of the present invention is directed to a method for manipulating video content that includes receiving authentication information to identify a user and providing a list of information identifying IPTV devices associated with the authentication information. Next an IPTV device selection is sent to the server from a secondary device to select an IPTV device. Reachability of the selected IPTV device is determined by the server in cases where communication between the secondary device and the selected IPTV device is routed through the server. In other cases, the secondary device may communicate directly with the selected IPTV device and the secondary device determines reachability of the selected IPTV device. Next one or more content choices are returned to the selected IPTV device based on the authentication information. User manipulation information is received by the server from the secondary device the content is processed based on the user manipulation information and the selected IPTV device. The processing of the content is performed independent from the reachability of the selected IPTV device. Thus, the reachability of the selected IPTV device does not affect the user's ability to manipulate content, which includes what content choices are available for the user to browse.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which:

FIG. 1 shows a block diagram of one embodiment of the present invention.

DETAILED DESCRIPTION

Figure 2A:
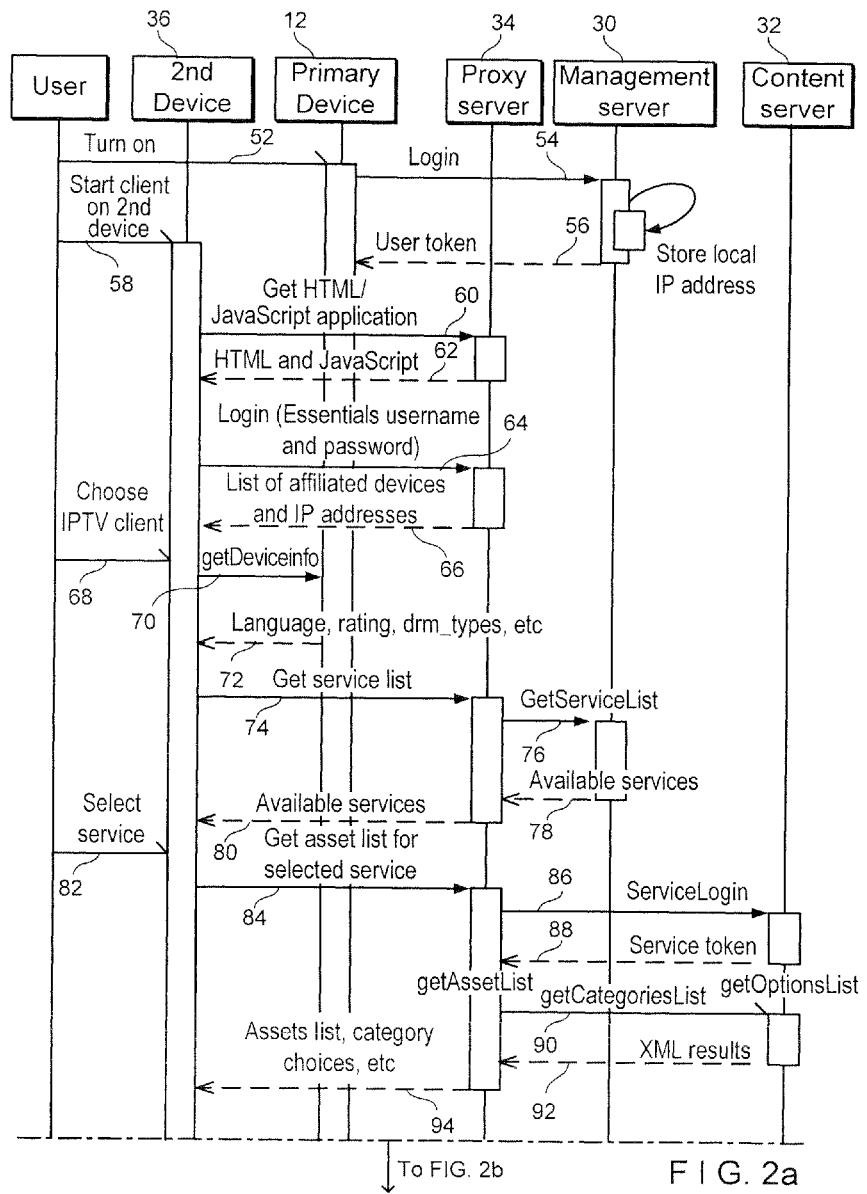
FIG. 2 shows a series of steps according to an embodiment of the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

Embodiments of the present invention may be implemented using one or more processing devices, or processing modules. The processing devices, or modules, may be coupled such that portions of the processing and/or data manipulation may be performed at one or more processing devices and shared or transmitted between a plurality of processing devices.

An IPTV device may be used to control home appliances through IPTV. These home appliances include, for example, video players, game players, home theater systems, digital video recorders, air conditioners, and etc. Household electrical appliances and audio-visual apparatuses, such as video cassette recorders (VCRs), televisions, air conditioners, and lighting apparatuses, may be furnished with remote controls. These remote controls each have operation units and functions specific to each apparatus. In order to control home appliances, a dedicated remote control may be placed in a vicinity of an associated home appliance. IPTV provides the ability to integrate different functions or different applications into a single control device to control multiple appliances. This single control device may be a smart phone, a digital personal assistant, a personal computer, lap top computer, tablet, or other device with adequate processing and/or storage capabilities. The single control device may transmit control signals through a public network or Internet or other network of operatively coupled computers, or processing devices or modules to an IPTV device, which uses the control command to control home appliances.

An IPTV device can access a vast pool of contents provided by numerous content providers. The IPTV device may also be used to control further distribution of content that has been provided by a third party to the IPTV device so that unauthorized access is prevented. Typically, IPTV is controlled by a single input device and has a single display device. As a shared device that is viewed by several users it is helpful to permit this sharing without excessively raising hardware costs.

Accordingly, a method is provided to enable a user manipulating, such as retrieving, playing, pausing and/or browsing content on a second device to have their selection played by a first device. The user can then continue to manipulate the content on any number of second devices without interrupting the content that is playing on the first device. The first device may be an IPTV device. The second device may be another electronic device. The method includes an architecture design and implementation that allows a user to navigate, browse, and search content on a second device that may be a consumer electronic device such as a Sony Ericsson® smart phone, VAIO PC®, VAIO® laptop, Mylo®, personal computer, or other apparatus with sufficient processing and storage capability, or any device with a web browser. Concurrently, while a user is using the first device, another user can perform these activities on the second device and send a media selection to the first device of the user's choice for playback.

A second device, also referred to as a secondary device and/or a secondary display device, herein, performs manipulating functions such as searching, content playback, browsing (when operable with a web browsing application) and may act as a visual aid to the IPTV device, but does not require additional investments by the user because it makes use of a device (such as a cellphone, laptop, etc) which most users would typically already have in their possession. The second device executes a program that allows the second device to act as the visual aid. It is a low cost solution which opens up a huge window of business and technical opportunities. It is a favorable complement to the IPTV because the device has strengths in data entry, processing power and user experience in content management. Thus, users will be able to use their personal devices, such as a cellphone, to browse content in their own language, perform data entry, search for content, manage their content, perform transactions and personalize their experience without disturbing the big screen of a first device. Users can send the content for playback on the IPTV when they are ready to watch it; and playback of proprietary content does not occur on the non-authentic device so security risks are minimized. The program may be written in any suitable programming language with desired functionality, e.g., JavaScript, HTML, or other programming language with the desired functionality, which can be loaded by any device with a browser, or an application written in languages which may not be run in a web browser, such as C, C++, Java, etc., hence not limited to only a small set of compatible devices.

An IPTV system typically includes an IPTV device and includes an IPTV client processor for controlling a video display to present content thereon. The system also includes a second device including a control processor and a management server communicating with the IPTV client over he Internet. The management server and IPTV client communicate with at least one content server such that the content server provides audio video content to the IPTV client for presentation of the content on the video display of the IPTV client. The system further includes a proxy server communicating with the management server and the second device. The IPTV client sends login information to the management server which returns to the IPTV client an IPTV session token that may subsequently be presented by the IPTV client to a content server to obtain content from the content server. The management server receives and stores a local IP address of the IPTV client, which may include, for example Uniform Resource Indicator (URI) or Uniform Resource Locator (URL) or a network location or network address. The management server can also store an external IP address, which allows communication from a secondary device, which is outside the network, to the IPTV device. Responsive to the second device sending a request to the proxy server for an executable utility, the proxy server returns the utility to the second device. Further, the second device, executing the utility, prompts a user to input to the second device login information. The proxy server, responsive to reception of correct login information from the second device, returns the local IP address of the IPTV client to the second device. The second device uses the local IPTV address to access the IPTV client directly to request information about the IPTV client, which information is returned from the IPTV client to the second device such that the local address of the IPTV client need not be globally addressable. Also the second device sends the information about the IPTV client to the proxy server, requesting a list of services available to the IPTV client from one or more content servers. The proxy server relays the request for a list of services to the management server, which returns the list to the proxy server, with the proxy server in turn sending the list to the second device for presentation of information on the video display. Responsive to a user selection of an element on the list, the second device sends a request for a software asset corresponding to the element to the proxy server. The proxy server requests a service login of the content server providing the asset, and the content server provides to the proxy server a list of assets or categories or services which relays the list to the second device, which is presented on the video display of the second device so that the user can navigate to enter a selection. Responsive to the selection the second device sends a command to the IPTV client to play the selection.

Embodiments include the IPTV client requests of the management server information about the selection received from the second device. The information is returned from the management server to the IPTV client to enable the IPTV client to play content associated therewith. If desired, the proxy server can request of the content server a list of options, and the list is returned to the proxy server. Asset information may be requested by the IPTV client and returned thereto by the content server. Also, a service login received from the second device may be sent by the IPTV client to the content server and a service token returned to the IPTV client in response. When a list of contents is sent to the second device, URL of contents may be removed from the list. The second device requests a content using a unique identifier of the content, the proxy server or the management server may use the unique identifier of the content to locate a corresponding URL of the content. In this way, the second device may not obtain the URL of a content so that unauthorized distributions of content are effectively prevented.

According to an embodiment of the present invention, a consumer electronics device (CE) may act as a second device, which includes a housing holding a display, a network interface, and a processor controlling the display and communicating with the Internet through the network interface. An input device communicates with the processor. The processor executing logic includes sending login information to a proxy server, and receiving from the proxy server, responsive to reception thereby of correct login information, a local IP address of an IPTV client. The processor uses the local IPTV address to access the IPTV client directly to request information about the IPTV client, sending the information about the IPTV client to the proxy server. Responsive to sending the information about the IPTV client to the proxy server, the processor receives content information, presenting it on the display from which a user can select a selected content. The processor commands the IPTV client to play the selected content.

According to an embodiment of the present invention, a proxy server assembly includes at least one processor and at least one network interface communicating with the processor to establish communication between the processor and a wide area network.

According to an embodiment of the present invention, at least one computer readable storage medium is accessible to the processor and bears logic causing the processor to receive login information from a second device. Responsive to a determination that the login information is correct, the server sends to the second device a local IP address of an IPTV client associated with the login information. The server receives from the second device information about the IPTV client requesting a list of services available to the IPTV client from at least one content server and sends a request for the list of services to a management server. The proxy server receives from the management server the list and sends it to the second device for presentation of information on a video display thereof. The proxy server then receives from the second device a request for a software asset and responsive to the request for the software asset, requests a service login of the content server. The proxy server receives back from the content server a list of assets or categories or services and sends the list to the second device. In this way, the list can be presented on a video display of the second device so that a user can navigate to enter a selection to command the IPTV client to play the selection.

According to an embodiment of the present invention, a first device is connected with a plurality of electronic devices. A second device may transmit control commands to the first device using a communication network or internet to control the plurality of electronic devices.

Referring to FIG. 1, an IPTV system may include a first device such as a client consumer electronics device 12, a second device such as another consumer electronics device 38, an electronic device 29 connected with the first device, a management server 30, a proxy server 34, and a content server 32. Each of the above devices and servers may have one or both a wired communication interface and a wireless communication interface.

The client consumer electronics device (CE) 12 such as a TV, game player, video disk player, camera, digital clock radio, mobile telephone, personal digital assistant, laptop computer, etc. includes a portable lightweight plastic housing 14 bearing a digital processor 16. The processor 16 can control a visual display 18 and an audible display 20 such as one or more speakers. The client consumer electronics device has a unique identifier that, without other means, is able to identify the client consumer electronics device within the IPTV system. The unique identifier may be assigned by a manufacturer or assigned by the management server when the client consumer electronics device is registered in the IPTV system.

To undertake present principles, the processor 16 may access one or more computer readable storage media 22 such as but not limited to RAM-based storage (e.g., a chip implementing dynamic random access memory (DRAM) or flash memory or diskbased-storage. Software code implementing present logic executable by the CE device 12 may also be stored on one of the memories shown to undertake present principles.

The processor 16 can receive user input signals from various input devices including a remote control device 24, a point and click device such as a mouse, a keypad, etc. A TV tuner 26 may be provided in some implementations particularly when the CE device is embodied by a TV to receive TV signals from a source such as a set-top box, satellite receiver, cable head end, terrestrial TV signal antenna, etc. Signals from the tuner 26 are sent to the processor 16 for presentation on the display 18 and speakers 20.

As shown in FIG. 1, a network interface 28 such as a wired or wireless modem or wireless telephony transceiver communicates with the processor 16 to provide connectivity to a wide area network such as the Internet. Double arrows in FIG. 1 indicate network communication between components over wired and/or wireless links. In this way, the client device 12 can communicate with a management server 30 on the Internet and with one or more content servers 32, also on the Internet and communicating with the management server 30.

If desired, each content server 32 may be associated with a respective proxy server 34 which interfaces the content server 32 with the device 12. The servers 30, 32, 34 have respective processors 30a, 32a, 34a accessing respective nontransitory computer readable storage media 30b, 32b, 34b which may be, without limitation, disk-based and/or solid state storage. The servers communicate with a wide area network such as the Internet via respective network interfaces 30c, 32c, 34c. It is to be understood in view of disclosure below that the CE device 12 particularly when implemented by a non-PC device such as a TV or game console or camera can communicate only with the management server 30 and with content servers 32 that appear on a service list provided to the processor 16 by the management server 30, with the service list not being modifiable by the processor 16.

The electronic device is connected with the first device 12 using a cable such as a 1394 cable or a HDMI cable or using a wireless communication interface such as infrared signals or Bluetooth. The electronic device may be a digital video recorder, a Blu-ray player, a game player, an audio amplifier, or an air conditioner. Storage may be any suitable electronic storage, such as RAM, ROM, EEPROM, or other storage medium, or cloud-based storage using local or remote storage via a network, such as storage at a remote server.

A second device 36 may be another consumer electronics device. The second device 36 may be another TV, game player, video disk player, camera, digital clock radio, mobile telephone, personal digital assistant, laptop computer, etc. The second device 36 with a housing 38 bears a digital processor 40 controlling a visual display 42 and an audible display 44 such as one or more speakers. To undertake present principles, the second or control processor 40 may access one or more computer readable storage media 46 such as but not limited to RAM-based storage (e.g., a chip implementing dynamic random access memory (DRAM) or flash memory or disk-based-storage. Software code implementing present logic executable by the second or control device 36 may also be stored on one of the memories shown to undertake present principles. Further, the second or control processor 40 can receive user input signals from various input devices 48 including a point and click device such as a mouse, a keypad, etc. A network interface 50 such as a wired or wireless modem or wireless telephony transceiver communicates with the processor 40 to provide connectivity to a wide area network such as the Internet.

Figure 2B:
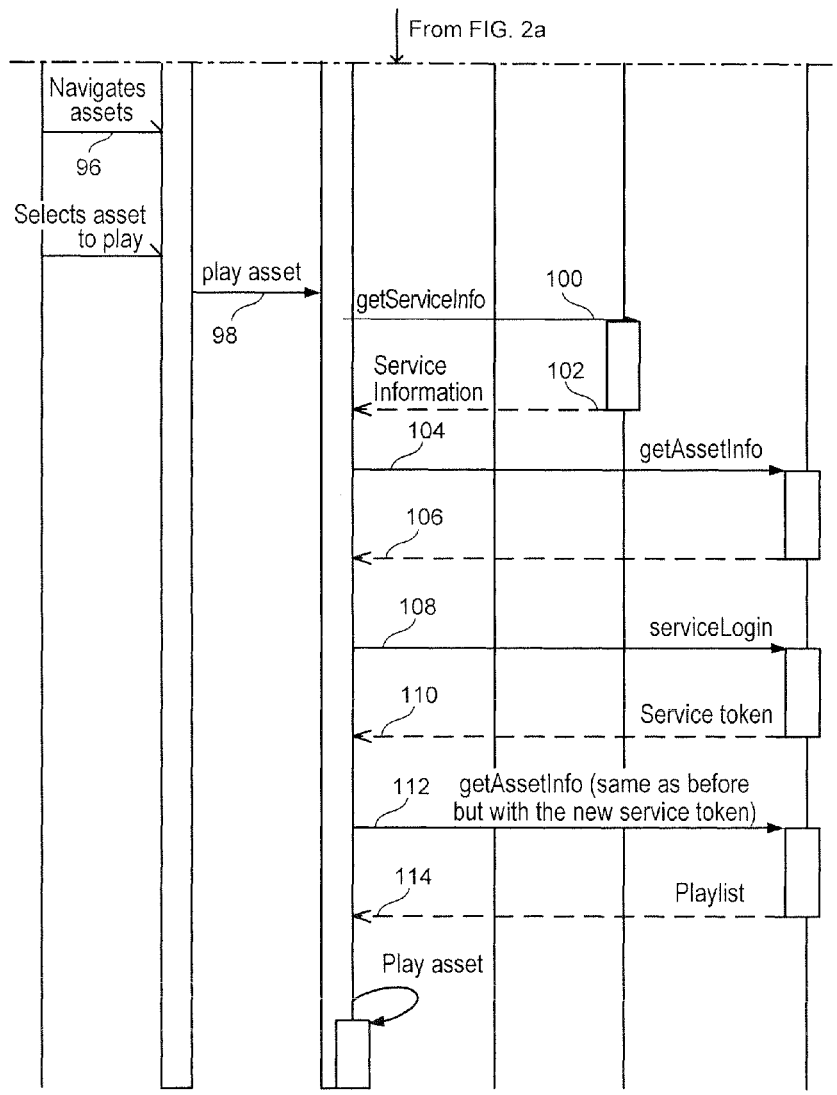

FIG. 2 shows an example embodiment of present principles for enabling a user to use a second device 36 to browse assets and select one to have a first device 12 such as a main IPTV client play the content (the IPTV client is also referred to as an IPTV client device and/or an IPTV device and/or IPTV, herein). FIG. 2 assumes that the user has already created an account with the management server 30 and has affiliated the main IPTV device with that account. In general, a user loads the application in the second device and logs into their user account, which may be the same account used for device registration. Once logged in, a list of compatible IPTV devices is presented. After the user selects a device, a list of services that the device is entitled to is provided. The user browses the services and their content, in his/her preferred language, on the second device as though it is an actual IPTV device such as the first device. Similar transactions, like video rentals or home shopping purchases, can also be made on the second device. Standard IPTV system interaction with service providers occurs on the proxy server, hence creating a firewall between the second device and content providers. Additional navigation features, like hyper-linked text which will open a new window and the management of premium services from a single location, provide better user experience in this IPTV system.

When a piece of content is selected, it may be sent to the IPTV for command execution (i.e., playback) in the form of a reference id which is used by the IPTV to retrieve content information. By eliminating the presence of the content URL on the second device, the risk of leaking major proprietary information which could result in huge losses is reduced. During the time of playback, the user can continue to browse for other content and queue it for future playback. The IPTV needs to be addressable by the second device to perform playback, which is the case when both devices are on the same local network. The user can also switch devices and resume playback on a different device such as the electronic device 19 in FIG. 1 by going to the recently viewed list and selecting the last video played after switching control to that device.

A detailed description of each state in FIG. 2 is provided as follows.

At state 52 a user turns on the first device 12, hereafter referred to as the "IPTV client" for convenience. At state 54 the IPTV client sends login information including, e.g., user name and password to the management server 30, which at state 56 returns to the IPTV client an IPTV session token that may subsequently be presented by the IPTV client to a participating content server 32 to obtain content from that server. Also, the management server 30 stores the local location (IP address or IP address and port number) of the IPTV client device 12. Alternatively, in another embodiment, the management server 30 does not return a token in response to receiving login information. Subsequently, no token is required to be presented by the IPTV client device to the participating content server 32 to obtain content.

At state 58, the user instantiates an IPTV client control utility on the second device 36.

The utility executed on the second device 36, at state 60, sends a request to the proxy server 34, which returns (62) hypertext markup language (HTML) with JavaScript for the second device 36 to execute in accordance with description below. This JavaScript makes asynchronous JavaScript and extended markup language (XML) (AJAX), or other suitable language, calls to the proxy server and to the IPTV client to obtain information to control the IPTV client. In another embodiment, step 60 may not be necessary where other client application implementations are used, such as one where the client application is not downloaded each time it is used. It should also be noted that other technologies (e.g. C, C++, Perl and Flash) can be used for the implementation of the client application and that neither HTML nor JavaScript are required.

With more specificity, at state 64 using the JavaScript, or alternatively, another method of implementing the client application, received from the proxy server 34, the second device 36 prompts the user to input to the second device 36 the user account information, such as account login information, including, e.g., the same user name and password that the IPTV client provided to the management server 30 at 54. Thus, the servers 30, 32, 34 communicate necessary account information between them as needed to realize present principles.

At state 66 the proxy server 34, responsive to a correct user name and password from the second device 36, returns information about all IPTV clients 12 that are affiliated with the user account, including their local IP addresses which were stored by the management server 30 after login at 54 (and subsequently provided to the proxy server 34).

When the user inputs to the second device 36 at state 68 a selected IPTV client (in this example, the IPTV client 12) to use with the second device, the second device 36, using the local IP address returned at state 66, accesses the IPTV client 12 directly. The second device 36 requests device information about the IPTV client device 12 at state 70, including language information, rating information, digital rights management (DRM) information, etc. as desired, which information is returned from the IPTV client 12 to the second device 36 at state 72. Since the second device 36 knows the IP address of the IPTV client device 12 and consequently communicates directly with the IPTV client device 12, the second device 36 communicates using a local web address of the IPTV client device 12 that need not be globally addressable, and may so communicate as long as the second device 36 and IPTV client device 12 are on the same local network.

At state 74 the second device 36 sends the client information received at state 72 to the proxy server 34, requesting a list of services available to the IPTV client device 12 from one or more of the content servers 32. The proxy server 34 relays the request for a list of services at state 76 to the management server 30, which returns the requested service list at state 78 to the proxy server 34. The proxy server 34 in turn sends the services list to the second device 36 at state 80 for presentation of available services on, e.g., the second device display 42.

State 82 indicates that a user can input (using, e.g., the second device input device 48) a selection of a service on the list that was returned to the second device at state 80. In response, the second device 36, at state 84, sends a request for a list of content and categories to the proxy server 34 along with a service session token that the second device may have received from the content server 32 via the management server 30.

Responsive to the request, at state 86 the proxy server logs into the service at state 86 of the content server 32 providing the selected service. At state 88 the content server 32 provides to the proxy server 34 a service session token for the particular content server 34. State 90 indicates that if desired the proxy server 34 may also request a list of content and categories of the content server 32 and the list is returned at state 92 in, e.g., extended markup language (XML) format to the proxy server 34, which relays the assets, categories, services, etc. available for selection to the second device 36 at state 94. When the list of assets or the list of options is provided to the second device, the URL associated with each asset or options are removed. A reference ID is added to the list for each asset and options. The second device requests a particular asset or option by using the reference ID. In this way, the second device may not obtain any URL of the assets or options.

The content available for selection is presented on the second device display 42 so that the user can navigate (96) the display to enter (98) a selection. Responsive to the selection the second device 36 at state 98 sends a command to the IPTV client 12 to play the selection. At state 100 the IPTV client device 12 then requests service information of the management server 30 information about the service the selected asset is in, logging in to the service if required. The requested information is returned from the management server 30 to the IPTV client device 12 at state 102, and when the IPTV client 12 receives the asset information it plays the asset at state 116. Note that if the IPTV client is already playing content the new content commanded to be played by the second device is placed in a queue in the IPTV client and played when the current content completes.

Note further that the second device may command the IPTV client to play content by sending to the IPTV client over the home network commands coded as if they were sent from an infrared remote control (IR RC), specifically for example the commands may be in Sony Infrared Remote Control System® (SIRCS) protocol. The second device may transmit command signals to the IPTV client to control the electronic device 29.

As shown in FIG. 2, if desired, temporally between states 102 and 106 a series of messages may be exchanged between the IPTV client 12 and the content server 32. For example, a request for content information may be made (104) by the IPTV client 12 and returned (106) by the content server 32. The above-described logging into the service may be relayed by the IPTV client 12 to the content server 32 at state 108 and a service session token returned to the IPTV client at state 110 along with the before-mentioned asset information. Also, a request of content information may be made (112) and a playlist returned to (114) the IPTV client device 12.

The software (e.g. JavaScript or HTML) that is downloaded at state 62 can be made available to all electronic vendors who wish their users to be able to navigate, browse, and search IPTV content on a second device. In an embodiment in which HTML is used, the software can be used on any client device with a web browser.

The following situations illustrate some scenarios where the second device complements the IPTV's shortcomings, hence providing better user experience for the IPTV user. For example, a group of friends is watching video clips on an IPTV. Each of them are browsing content on their own Second Display and queuing up selections. In another example, someone is looking for content on a particular subject. They are able to quickly type in search terms using their second device even when those terms contain characters not supported by their IPTV. In another example, a man is watching the end of a ball game on the IPTV while his wife uses a second display to select a movie for them to watch when the game ends. In another example, a user may be away from an IPTV, but the user may use a smart phone as the second device to browse contents and select a preferable content to be played on the IPTV.

In the above-identified situations, using a second device can provide many benefits, such as:
Browsing in own language without disturbing the big screen
Ease of data entry in a language not supported by the IPTV
On-device service affiliation for premium services like Netflix
Cross-device playback and resume from a recently viewed list
Social sharing of content to enhance content proliferation
Management of subscription-based services from a single location
Browsing and queue management when away from the IPTV device or when not in proximity to the IPTV device One-click Customer service without the need of entering personal or device information Quick access to relevant device specifications and manuals Hyper-linked text in forms directs users to informational sites Content Queue across devices Advertisement revenue through Second display usage The second device provides an enhanced user experience of the IPTV without adding to the hardware costs of the unit, making data entry easy and allows users to browse content on the side. IPTV is also a global solution which connects various IPTVs together in a cohesive manner through its potential of initiating playback across devices providing the highest level of customer service to users through its one-click customer service feature, where users do not even need to provide any device information which can be difficult to retrieve in the event of a device breakdown.

Figure 3:
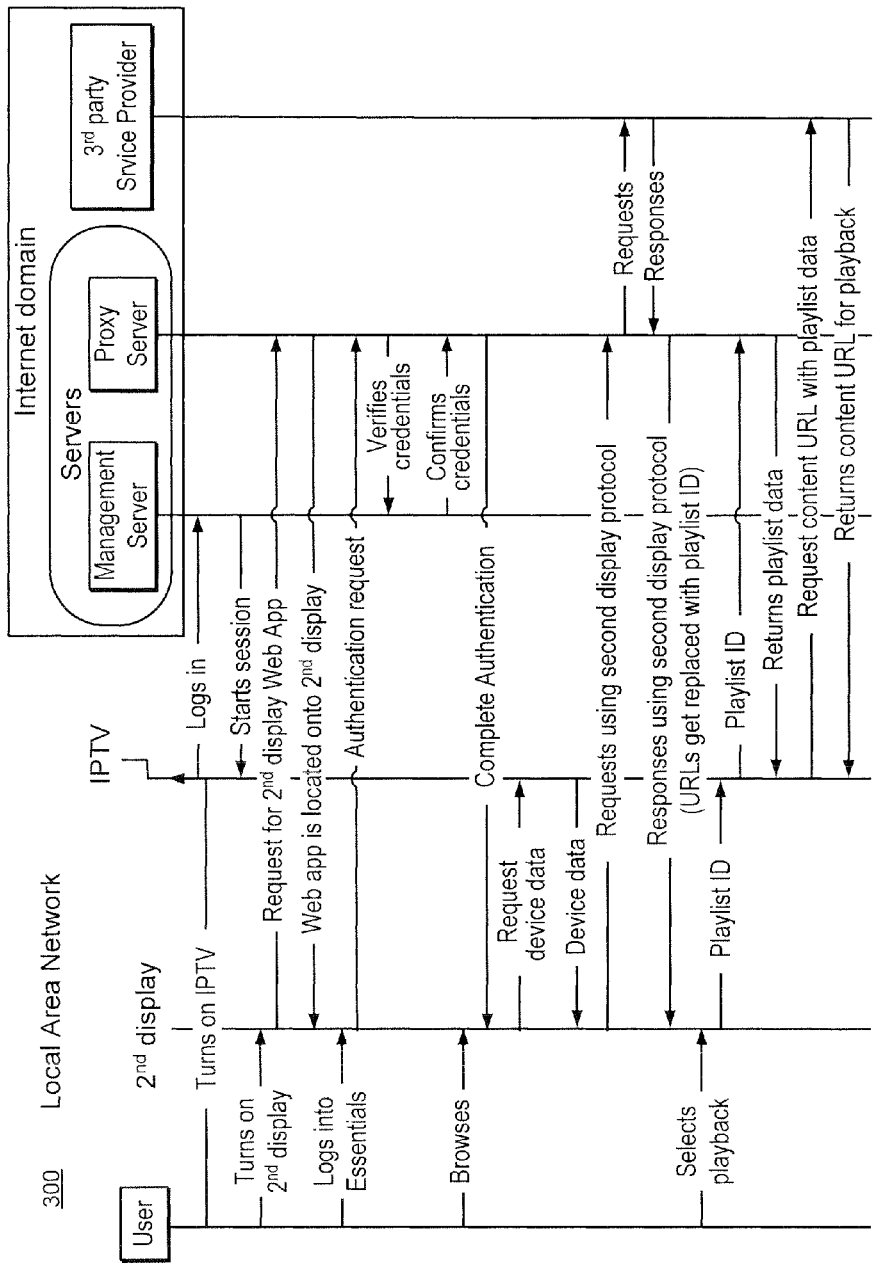
FIG. 3 shows a schematic representation of an embodiment of the present invention.

FIG. 3 shows a schematic representation 300 of an embodiment in which the present invention finds ready application. First a user turns on an IPTV client. The IPTV logs into the management server using device credentials, so that the management server knows which IPTV device is in communication. The user does not have to interact or provide any information as part of this device interaction. The management server starts the session. Then the user turns on the second display. In an embodiment in which the second display does not have the second display application, the second display requests the second display application from the proxy server, which may be a local or remote server and the second display application, is loaded onto second display. In another embodiment, the second display application is installed on the second display. Then the user logs into the user account. An authentication request is sent from the second display to the proxy server. The proxy server verifies credentials with the management server, and then the management server confirms credentials with the proxy server. So that authentication is completed.

Then the user browses an Internet video link (IVL). After that, the device data is requested from the second display and then the requested device data is sent from the proxy server to the second display device. Thus, the second display device can be used to display content even when the IPTV device is not available. The use of the second display device to display content depends on the display capabilities and display functions of the second display device. The second display sends a request using second display protocol to the proxy server, and then the proxy server sends a request to a service provider, and the service provider responds. The proxy server responds using a second display protocol to the second display with the associated URL replaced with playlist ID.

After the user selects playback, the second display device attempts to send the playlist ID to the IPTV client device. When the IPTV client device is reachable, the playlist ID is received. Then the playlist ID is sent from the IPTV client device to the proxy server, and playlist data is returned from the proxy server to the IPTV client device. The IPTV client device requests a content URL with playlist data of the service provider, and then the service provider returns the content URL for playback to the IPTV client device. When the IPTV client device is not reachable, the playlist ID is not received and the second display device notifies the user that the IPTV client device is not reachable. The second display device stores the Playlist ID for a later attempt at sending to the IPTV client device.

In another embodiment, the second display device may inform a server of the playlist ID and when the IPTV device is connected to the server, may receive the request even when the IPTV device and the second display device are on separate local networks and cannot address each other. In this case, the IPTV device may still not be reachable, as in a case where the IPTV device may not be connected to a power supply, and the request is queued at the server to be sent at a later time when the IPTV device is reachable.

Figure 4:
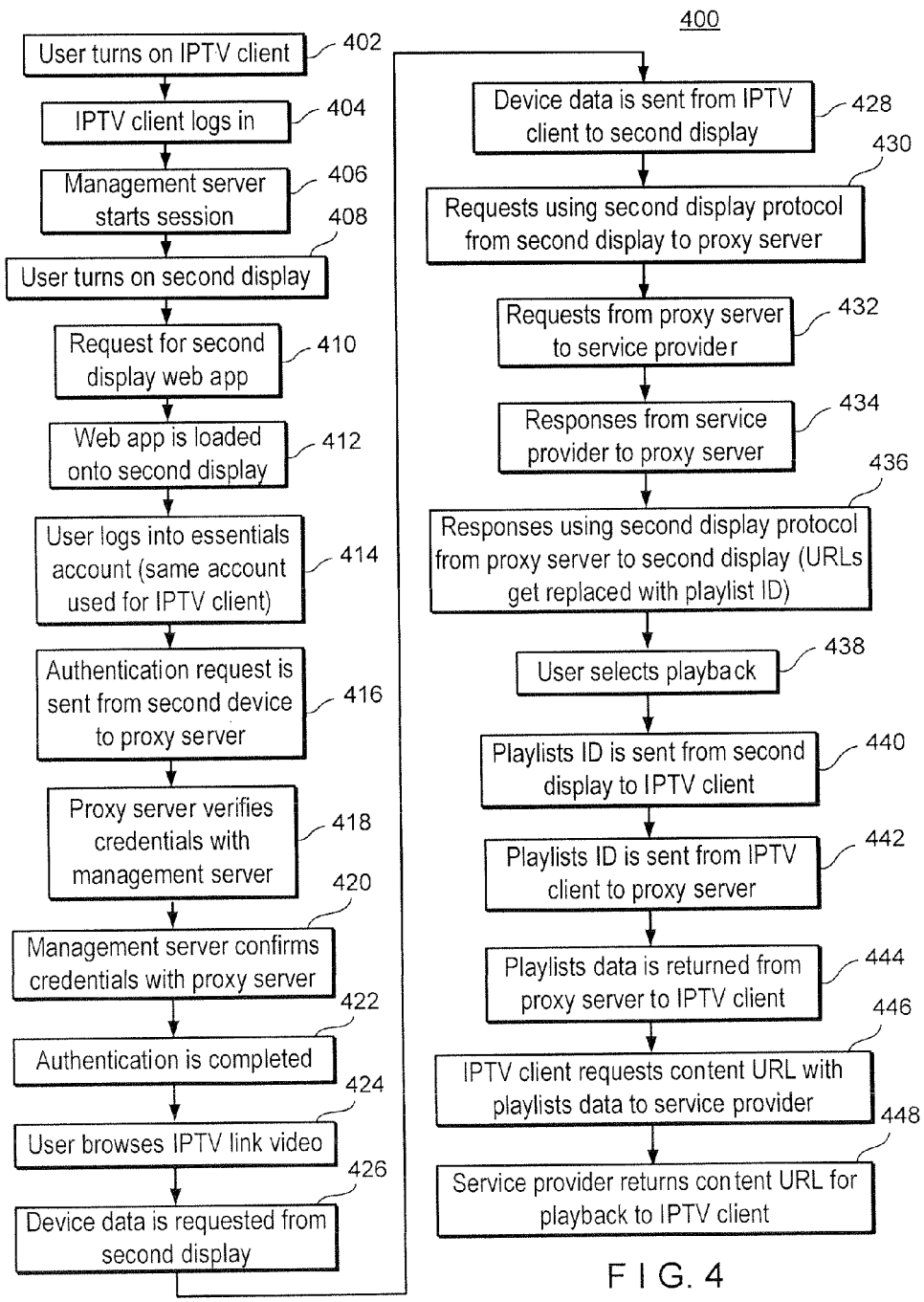
FIG. 4 shows a flow chart of processing steps according to an embodiment of the present invention.

FIG. 4 shows a flow chart 400 of processing steps according to the embodiment of FIG. 3.

The process begins in step 402 in which the user turns on IPTV client device. After the IPTV client device is registered with the management server, or authenticated with the management server, as shown in step 404, the management server starts the session in step 406. Then in step 408 the user turns on the second display, and, when necessary, requests for second display application to a proxy server, as shown in step 410. The request for the second display application is optional. In some embodiments of the present invention, the second display will receive the second display application every time the application is started, while it is also an embodiment of the present invention that the second display device will not receive the second display application or only on a software update. When requested, the application is loaded onto second display in step 412. In step 414 the user logs into the account, which is the account the IPTV device is registered to. In step 416 an authentication request is sent from the second display to the proxy server. In step 418 the proxy server verifies credentials with the management server, and then in step 420 the management server confirms credentials with the proxy server. In step 422 authentication is completed. It is an embodiment of the present invention that the server in steps 418 and 420 may be in the same server. Alternatively, there may be more than two servers splitting the server tasks.

In step 424 the user is presented with a list of IPV devices affiliated, or associated with, the secondary display device via the user account. In step 426, when a user selects a particular IPTV device to communicate with, an application program interface (API) call is sent to the selected IPTV device, the device data is requested by the second display device and then in step 428 the requested device data is sent by the proxy server to the second display device, this information may include information specific to the IPTV device such as content rating permitted by that device, language, etc. In an embodiment in which the user has already selected an IPTV device in a previous session, an API call may be sent to that IPTV device to obtain device information without the user making a request. Also, according to an embodiment of the present invention, the user may set a particular IPTV device as the default device in a list of IPTV devices. In step 430 the second display sends a request, using a second display device API, to proxy server for options, categories and content list. Then in step 432 the proxy server in turn requests them from the service provider. The service provider responds with options, categories and content list, as shown in step 434. In step 436 the second display device receives categories, options and a content list from the proxy server and displays them for the user. Alternatively, the proxy server may send content to the second display device with the associated URL replaced with playlist ID. Alternatively, the service provider may permit, in some cases, that the URL be sent to the second display device. For example, the second display may have a secure application, and the service provider may allow a second display with a secure application to receive the URL. Thus, the content URL may be transmitted to the IPTV device for playback, rather than having the IPTV device retrieve the data from the server.

In step 438 the user selects content for playback and a playlist is created for that content and stored in the proxy server. Then in step 440 a playlist ID is sent from the second display device to the IPTV client device. If the IPTV client does not answer or does not acknowledge the request to play the content, or is unable to play the content at the time, such as when the IPTV client device may be on and reachable, but a viewer has enacted a "do not disturb" mode, the second display device informs the user that the IPTV client device is unreachable (not available to play the content at this time) and queues the request to be repeated at a later time when the IPTV client device is reachable. In step 442 the playlist ID is sent from IPTV client to proxy server, and returned from proxy server to IPTV client in step 444. In step 446 IPTV client requests content URL with playlist data to service provider, and then in step 448 the service provider returns content URL for playback to the IPTV client. Alternatively, the proxy server may store the URL content and thus, return the URL content to the IPTV client device without the need to request the content at the URL associated with the playlist data from the service provider. Thus, when the proxy server stores the URL, step 446 is not used, rather, once the IPTV client device obtains the URL, the IPTV client device can start playback.

Figure 5:
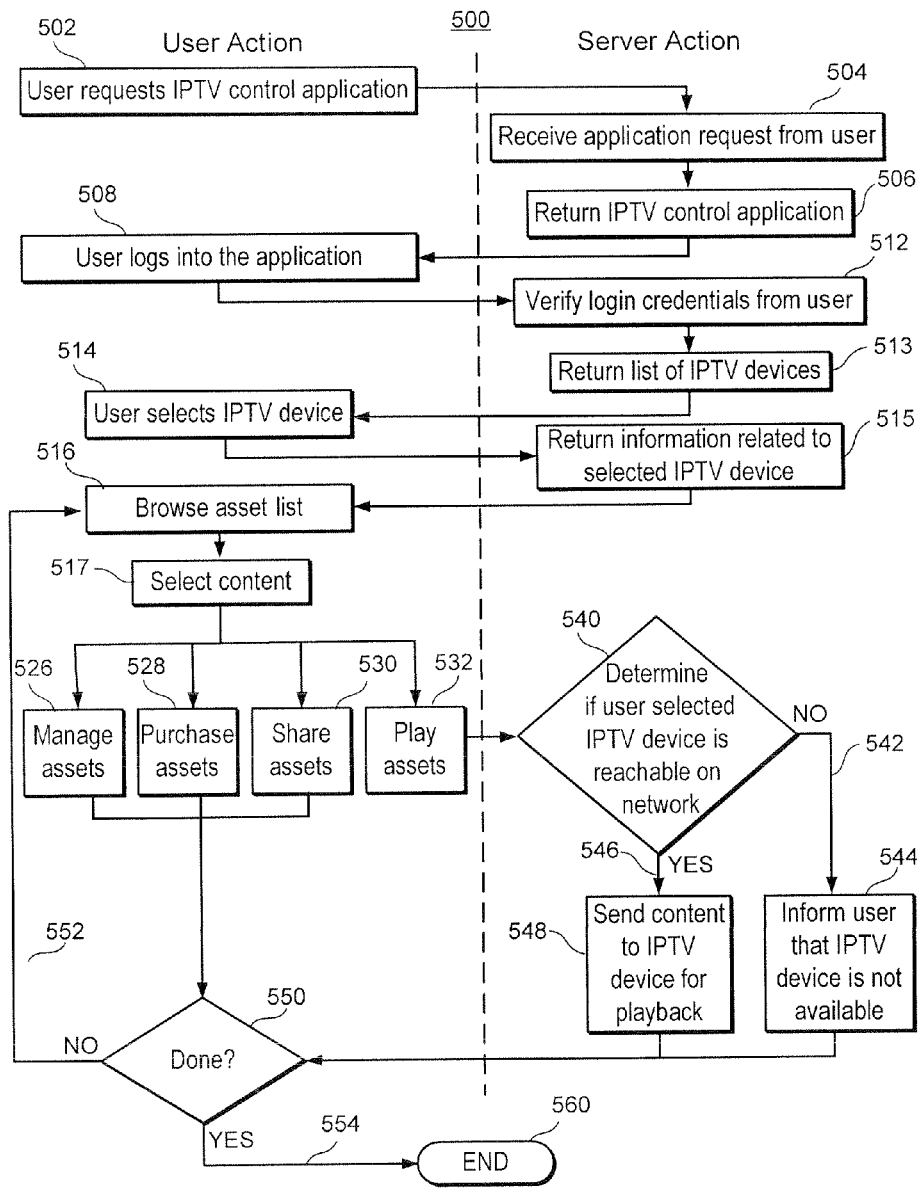
FIG. 5 shows an example of steps for browsing video content.

FIG. 5 shows a series of steps 500 according an embodiment of the present invention. As shown in FIG. 5, the leftmost portion shows "user actions", which are actions taken by a user and the right-most portion shows "server actions", which include server functions. The user requests an IPTV control application, such as a web application or a webpage, via a suitable input device, from a browser that accesses the requested application, as shown in step 502. The input device is typically a secondary device, such as a mobile telephone or other non-IPTV device that communicates with a proxy server so that some of the material displayed on the secondary device is, in some instances, similar to the display on the IPTV device. For example, the display on the secondary device will have the same tokens and views as the IPTV device. The secondary device may, or may not, be able to communicate with the IPTV device since the secondary device is in communication with the proxy server.

As shown in step 504 the proxy server receives the request for the IPTV application from the user and returns an IPTV control application to the user device, as shown in step 506. The IPTV control application that is returned by the proxy server may be implemented using many different technologies, such as a web application or a webpage.

As shown in step 508, the user then logs into the application, e.g., by logging onto the website. The proxy server verifies the login information from the user, as shown in step 512. Based on the account information of the user, the proxy server then returns a list of IPTV devices to the user, as shown in step 513. The proxy server maintains a list of each IPTV device registered to the user and information specific to each IPTV device.

The user selects from the list an IPTV device on which he wishes to view available content, as shown in step 514. Alternatively, the selection may be made on the same webpage as the login screen or on a subsequent page. The selection may come from a list or may be entered manually. The list may be saved in a database at the server. The saved list may be identified by the username or the Internet enabled device.

The proxy server then returns information related to the selected IPTV device, as shown in step 515. The information may include what content to present to the user to browse through. The information may be determined based on which IPTV device is targeted by the user's selection. For example, the information may be a list of content the user may select from, which is sent by the proxy server based on the user selection of the IPTV. Alternatively, the information may be related to the IPTV device and the secondary device, such as a mobile device may use that information to filter what content it presents to the user. In either embodiment, no communication is necessary between the secondary device and the IPTV device. The proxy server and the mobile device base content choices on the information about the IPTV device. For example, content that is only viewable in a country or region other than where the selected IPTV device is, will not be presented. As another example, content requiring protocols, codecs, software programs, or hardware requirements not supported by or available to the selected IPTV will not be presented.

The user can then browse, using the secondary device, the available content, as shown in step 516. After browsing the available content, the user may select content for a number of functions, as shown in step 517. Functions that the user can execute on the application are purchasing assets, as shown in step 528, from premium services or a shopping website or network, manage assets or manage an asset list, shown in step 526, share an asset or an asset list, shown in step 530 or play an asset or assets, as shown in step 532.

If the user chooses to play an asset (532), an application running on the secondary device will determine if the IPTV device is reachable, as shown in step 540. The application running on the secondary device may determine for example, if the IPTV is in the same local network, may determine if the IPTV is "on" or "off", or may determine if the IPTV device is within a predefined proximity. If it is determined that that IPTV device is reachable, the method follows the "yes" line (546) to step 548, where the proxy server sends content to be played by the IPTV device, as shown in step 548. If at step 540, the server determines that the IPTV device is not reachable, such as when the IPTV device is off or in a "do not disturb mode, or on a different network where an IP address is not addressable outside of the local network where the IPTV device is located, the method follows the "no" line (542) and proceeds to step 544, where the user is notified that the IPTV device is not currently available. In another embodiment, when the IPTV is in a "do not disturb" mode, the secondary device may determine that the IPTV device is reachable, but cannot currently play content. The secondary device may inform the user that the IPTV device cannot currently play content. In yet another embodiment, the second display device may contact the IPTV device through an external server. In this embodiment, if the IPTV device has a local address that is only addressable from within the same local network, the IPTV device establishes communication with the external server to be receptive to attempts for communication. The IPTV device may still not be reachable, for example when the IPTV device is not currently connected to a power supply. Alternatively, the IPTV device may also be reachable, but may not accept the request to play the content, such as when it is in a do not disturb mode.

After the user has chosen to purchase an asset, share an asset, manage an asset list, browse assets, or play assets, a determination is made whether the user has finished, as shown in step 550. If the user is not done, the "no" line 552 shows that the process proceeds to step 516, where the user browses the available content. If the user is done, the "yes" line 554 shows that the end step 560 is reached.

Figure 6:
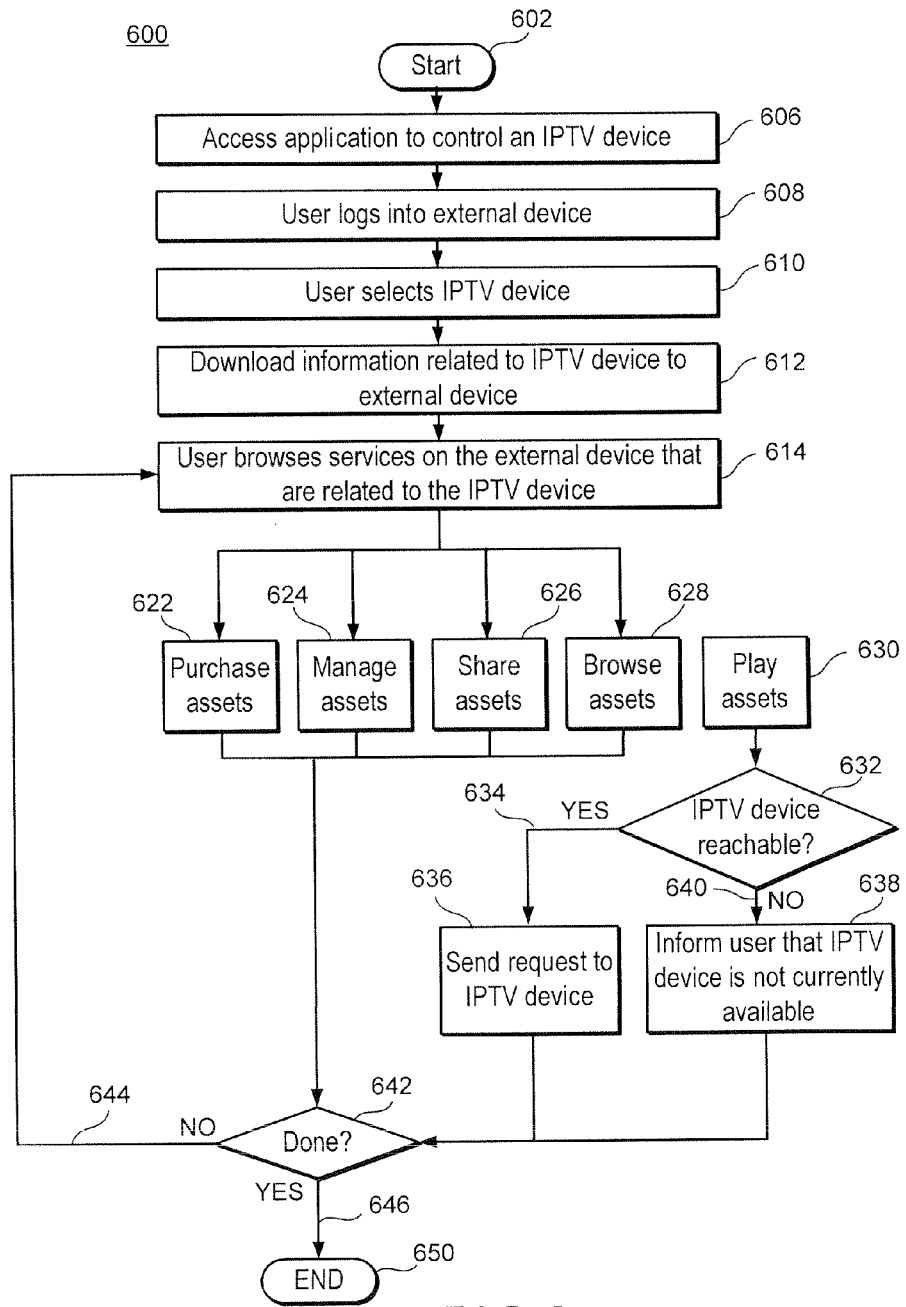
FIG. 6 shows a series of steps to execute an embodiment of e present invention.

FIG. 6 shows a series of steps 600 to execute an embodiment of the present invention.

The series of steps begins at start step 602. The user may execute an application such as WINDOWS MOBILE™, OPERA™ or CHROME™ on an internet enabled mobile device, or on an internet enabled second display device. Alternatively, the application may be an "app", which is an application that runs on various operating systems, such as WINDOWS MOBILE OS®. Alternatively, in the case an "app" is launched, the "app" may be directed to the desired uniform resource locator (URL), or uniform resource indicator (URI) by program code stored in the "app". For example, the internet enabled device then accesses the webpage addressed by the URL, as shown at step 606. The webpage may be a log in screen requiring a user name and password or other identifying information. The user enters the identifying information, i.e. logs in with a username and password, as shown in step 608.

The user selects an IPTV device on which he wishes to view the content of the accessed website, as shown in step 610. The selection may be made on the same webpage as the login screen or on a subsequent page. The selection may come from a list or may be entered manually. The list may be saved in a database at the server. The saved list may be identified by the username or the internet enabled device.

The internet enabled device then downloads information related to the selected IPTV device, as shown in step 612. The information may include what content to present to the user to browse through, as shown in step 614. The information may be determined based on which IPTV device is targeted by the user's selection. For example, the information may be a list of content the user may select from, which is sent by the server based on the user selection of the IPTV. Alternatively, the information may be related to the IPTV device and the mobile device may use that information to filter what content it presents to the user. In either embodiment, no communication is necessary between the secondary device and the IPTV device. The server and the secondary device base content choices on the information about the IPTV device. For example, content that is only viewable in another country or region than where the selected IPTV device is will not be presented. As another example, content requiring protocols, codecs, software programs, or hardware requirements not supported by or available to the selected IPTV will not be presented.

The user can then select content for a number of functions. Functions that the user can execute on the web application are purchasing assets, as shown in step 622, from premium services or a shopping website or network, manage an asset list, shown in step 624, share assets, shown in step 626, and browse assets, as shown in step 628, by interacting with service providers to search for new content, and playing assets, as shown in step 630.

If the user chooses to play an asset, as shown in step 630, an application running on the secondary device will determine if the IPTV device is reachable, as shown in step 632. The application may determine if the IPTV is in the same local network, may determine if the IPTV device is on or off, or may determine if the IPTV device is within a predefined proximity. If it is determined that that IPTV device is reachable, the method follows the "yes" line (634) to step 636, where the server sends a play request to the IPTV device. If at step 632, the server determines that the IPTV device is not reachable, the method follows the "no" line (638) to step 640, where the user is notified that the IPTV device is not currently available. In another embodiment, when the IPTV device is in a "do not disturb" mode, the secondary device may determine that the IPTV device is reachable, but cannot currently play the content. The secondary device may inform the user that the IPTV device cannot currently play the content.

After the user has chosen to purchase an asset, share an asset, manage an asset list, browse assets, or play assets, a determination is done on whether the user is done, as shown in step 642. If the user is not done, the "no" line 644 goes back to step 614, where the user browses the available content. If the user is done, the "yes" line 646 shows that the method reaches the end step 650.

Yet another embodiment of the present invention is directed toward a method of manipulating video content using a selected IPTV device and a secondary device, which may or may not be an IPTV device. The secondary device and selected IPTV device can be operatively coupled to a server that can facilitate operation of the secondary device and selected IPTV device. One example includes requesting a status indication from the selected IPTV device regarding present activity of the selected IPTV device. The selected IPTV device then sends a response to the status request to the server or to the secondary device, which can send the response to the server. Then the server, in communication with the secondary device and selected IPTV device, determines a time when the selected IPTV device will be reachable based on the response. This information can then be sent to the secondary device.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method for manipulating video content comprising:
accessing, from a server, a list of one or more IPTV devices;
selecting an IPTV device from the list;

receiving, from the server, a content list of content that is available to be played on the selected IPTV device; and inputting a control function from a secondary device that is used to control operation of the selected IPTV device, wherein execution of the control function input by the secondary device, to control operation of the selected IPTV device, is queued by the server for later execution when the IPTV device is on but not reachable by the secondary device and the IPTV device is unavailable to execute the control function and the secondary device informs a user that the IPTV client device is not available to play the content at this time.

2. The method according to claim 1, wherein the control function comprises:

determining whether the selected IPTV device is reachable; and playing content on the selected IPTV device when the selected IPTV device is determined to be reachable.

3. The method according to claim 1, further comprising:

requesting a status indication from the selected IPTV device regarding present activity of the selected IPTV device;

receiving a response from the selected IPTV device to the status request; and determining a time when the selected IPTV device will be reachable based on the response.

4. The method according to claim 1, further comprising:

modifying available control functions from the secondary device based on reachability of the selected IPTV device.

5. The method according to claim 4, wherein the modification includes submitting the control function to the server after expiration of a pre-determined time interval.

6. The method according to claim 1, wherein the function includes: managing content, playing content, purchasing content, browsing content and/or sharing content.

7. The method according to claim 1, further comprising:

identifying content that may be displayed on the selected IPTV device using a reference identification.

8. The method according to claim 1, further comprising:

sending a reachability inquiry to the selected IPTV device to determine whether the selected IPTV device is reachable.

9. The method according to claim 1, further comprising:

sending a reachability inquiry to a server configured to connect to the selected IPTV device to determine whether the selected IPTV device is reachable.

10. A method for providing video content comprising:

receiving authentication information to identify a user;

providing a list of information related to IPTV devices associated with the authentication information;

receiving an IPTV device selection from a secondary device to select an IPTV device;

returning one or more content choices available to be played on the selected IPTV device based on the authentication information and reachability of the selected IPTV device;

receiving user manipulation information from the secondary device; and processing content based on the user manipulation information and the selected IPTV device, wherein processing content based on the user manipulation information, to control operation of the selected IPTV device, is queued by the server for later execution when the IPTV device is on but not reachable by the secondary device and the IPTV device is unavailable to process the user manipulation information and the secondary device informs the user that the IPTV client device is not available to play the content at this time.

11. The method according to claim 10, further comprising:

receiving an application request for retrieval of a desired application from the secondary device.

12. The method according to claim 10, further comprising:

identifying the secondary device based on the authentication information.

13. The method as claimed in claim 10, further comprising:

providing content for browsing when the selected IPTV device is reachable.

14. The method as claimed in claim 10, further comprising:

determining whether the selected IPTV device is reachable; and providing an indication when the selected IPTV device is not reachable.

15. The method of claim 10, further comprising:

providing one or more icons for display on the secondary device, wherein the size of the one or more icons depends on a user interface of the secondary device.

16. The method of claim 10, further comprising:

determining whether the selected IPTV device is reachable in response to user requested playback of content.

17. The method of claim 10, further comprising:

receiving a reachability request from the secondary device; and providing a response indicative of whether the selected IPTV device is reachable.

18. The method of claim 10, further comprising:

receiving a reachability request from a server operable to connect to the selected IPTV device; and providing a response indicative of whether the selected IPTV device is reachable.

* * * * *